(12) United States Patent
Walbaum et al.

(10) Patent No.: US 12,255,520 B2
(45) Date of Patent: Mar. 18, 2025

(54) MOTOR AND METHOD FOR COOLING A MOTOR

(71) Applicant: Punch Powertrain N.V., Sint-Truiden (BE)

(72) Inventors: Markus Walbaum, Sint-Truiden (BE); Riné Pelders, Sint-Truiden (BE); Maximilian Hombsch, Sint-Truiden (BE); Jan Willem Van Der Vecht, Sint-Truiden (BE); Alberto Arcos, Sint-Truiden (BE)

(73) Assignee: PUNCH POWERTRAIN E-VEHICLES NV, Sint-Truiden (BE)

( * ) Notice: Subject to any disclaimer, the term of this patent is extended or adjusted under 35 U.S.C. 154(b) by 233 days.

(21) Appl. No.: 17/789,703

(22) PCT Filed: Dec. 30, 2020

(86) PCT No.: PCT/EP2020/088055
§ 371 (c)(1),
(2) Date: Jun. 28, 2022

(87) PCT Pub. No.: WO2021/136819
PCT Pub. Date: Jul. 8, 2021

(65) Prior Publication Data
US 2023/0034673 A1    Feb. 2, 2023

(30) Foreign Application Priority Data

Dec. 31, 2019  (BE) .................................. 2019/6010

(51) Int. Cl.
*H02K 1/32* (2006.01)
*H02K 5/20* (2006.01)
*H02K 9/197* (2006.01)

(52) U.S. Cl.
CPC ............... *H02K 9/197* (2013.01); *H02K 1/32* (2013.01); *H02K 5/20* (2013.01)

(58) Field of Classification Search
CPC .. H02K 5/20; H02K 5/02; H02K 5/04; H02K 5/08; H02K 41/031; H02K 1/193;
(Continued)

(56) References Cited

U.S. PATENT DOCUMENTS

2013/0328423 A1   12/2013  Ikeda et al.
2015/0015099 A1   1/2015   Matsuki et al.
(Continued)

FOREIGN PATENT DOCUMENTS

CN    102823113 A    12/2012
CN    109546792 A    3/2019
(Continued)

OTHER PUBLICATIONS

WO 2013085698 Translation (Year: 2013).*
(Continued)

*Primary Examiner* — Bryan R Perez
(74) *Attorney, Agent, or Firm* — Pillsbury Winthrop Shaw Pittman, LLP

(57) ABSTRACT

The disclosure describes a motor comprising a rotor shaft comprising a cooling channel having at least one inlet for receiving cooling fluid, and at least one outlet section fluidly connected to the cooling channel at an outer side of the rotor shaft and arranged to allow cooling fluid to flow out of the cooling channel, wherein an outlet opening of the at least one outlet section is placed at a larger radial distance from the rotational axis than an internal cross sectional area of the cooling channel inside of the rotor shaft.

25 Claims, 12 Drawing Sheets

(58) Field of Classification Search
CPC .. H02K 1/32; H02K 1/20; H02K 9/16; H02K 9/19; H02K 9/18; H02K 9/197; H02K 9/20; H02K 9/06; H02K 9/14

See application file for complete search history.

(56) References Cited

U.S. PATENT DOCUMENTS

| | | |
|---|---|---|
| 2015/0069861 A1* | 3/2015 | Buttner .................. H02K 9/14 310/43 |
| 2016/0013704 A1 | 1/2016 | Wagner et al. |
| 2016/0164378 A1 | 6/2016 | Gauthier et al. |
| 2018/0351434 A1 | 12/2018 | Knoblauch et al. |
| 2019/0173343 A1 | 6/2019 | Yamaguchi |

FOREIGN PATENT DOCUMENTS

| | | | |
|---|---|---|---|
| EP | 2645545 A2 | 10/2013 | |
| EP | 3028888 A1 | 6/2016 | |
| WO | WO-2013085698 A2 * | 6/2013 | ........... C09D 5/4438 |
| WO | WO-2019072489 A1 * | 4/2019 | |

OTHER PUBLICATIONS

WO 2019072489 Translation (Year: 2019).*

International Search Report dated Feb. 1, 2021, issued in corresponding International Application No. PCT/EP2020/088055 (3 pgs.).

Written Opinion of the International Searching Authority dated Feb. 1, 2021, issued in corresponding International Application No. PCT/EP2020/088055 (6 pgs.).

* cited by examiner

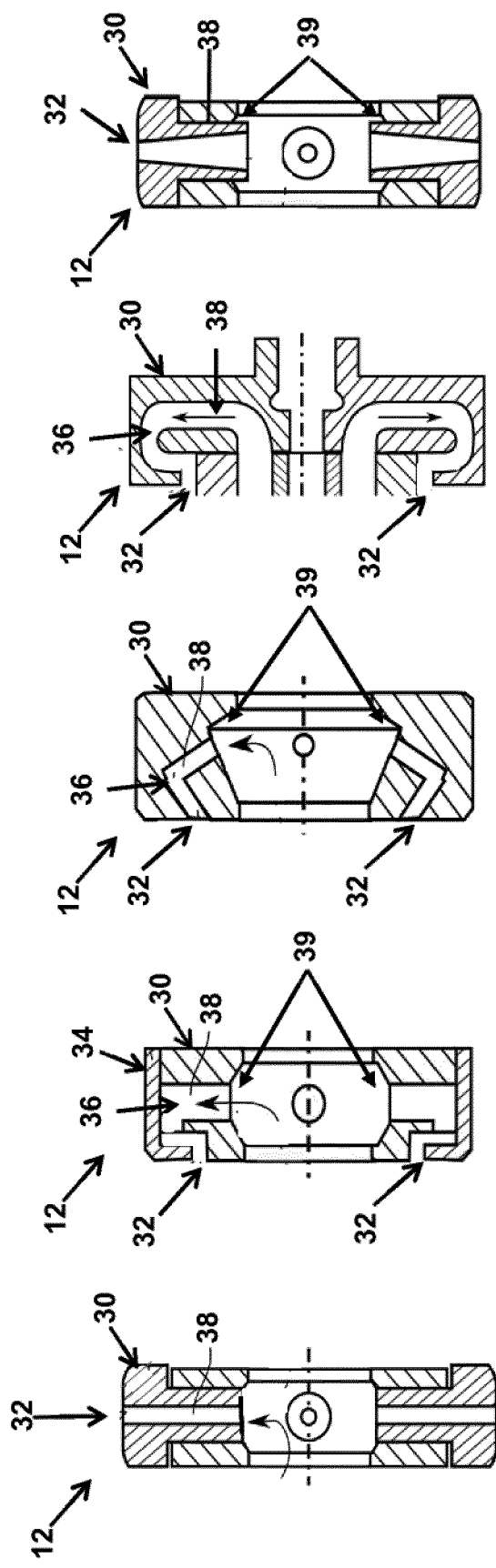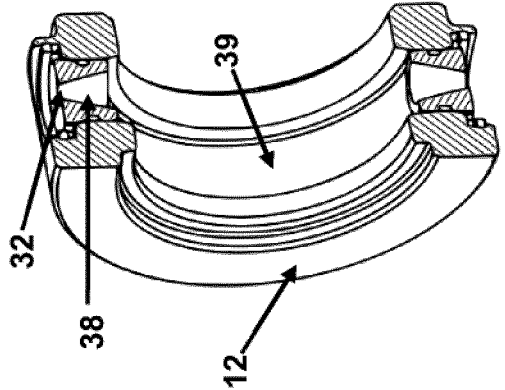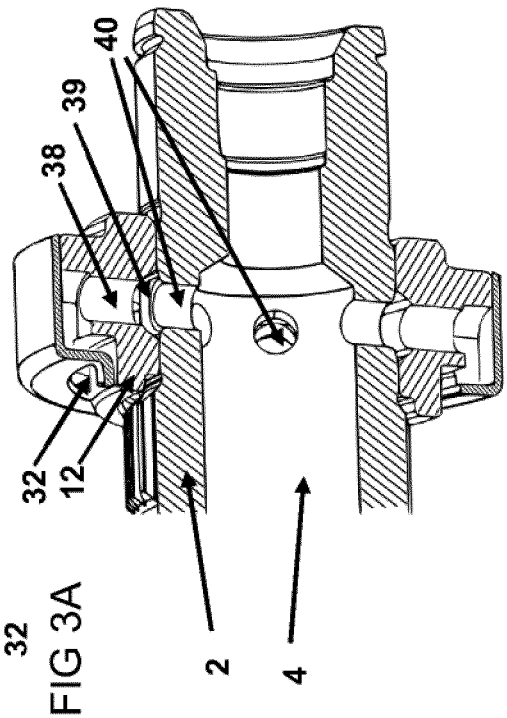

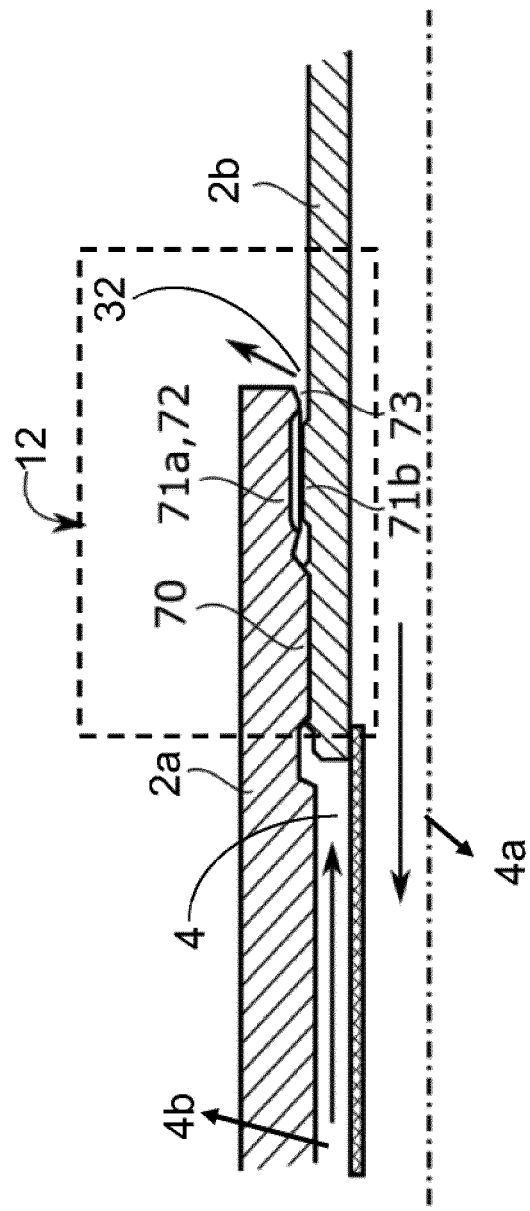

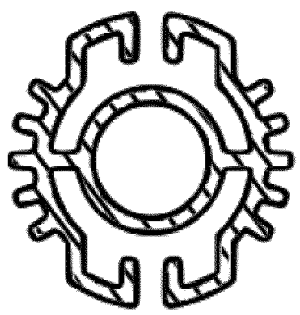
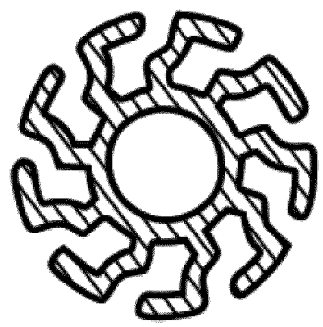
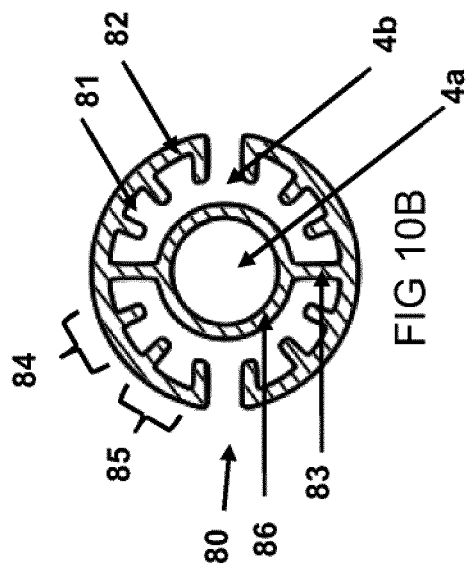
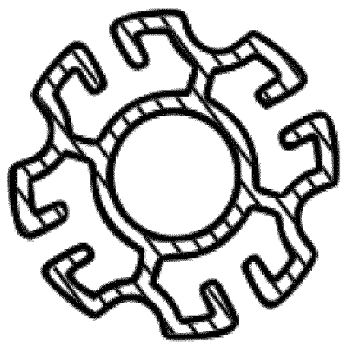
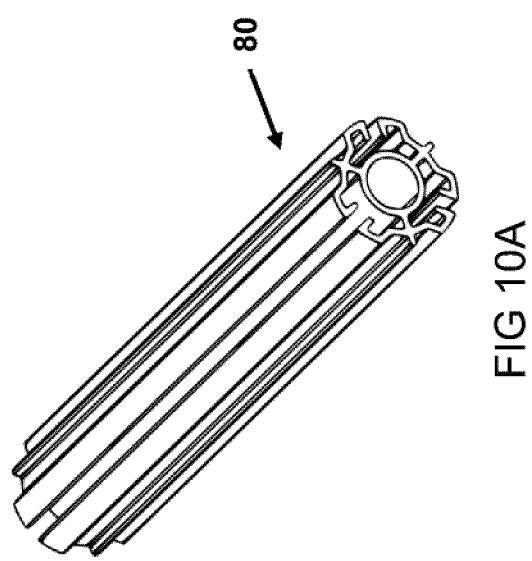
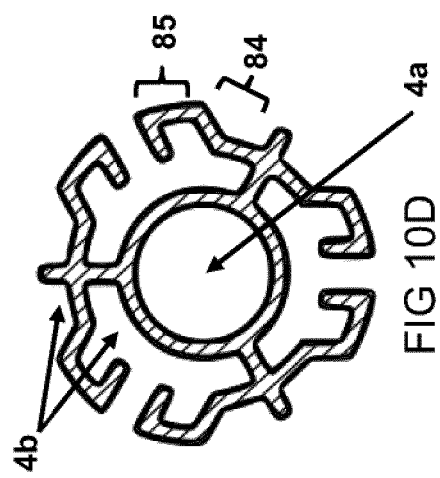

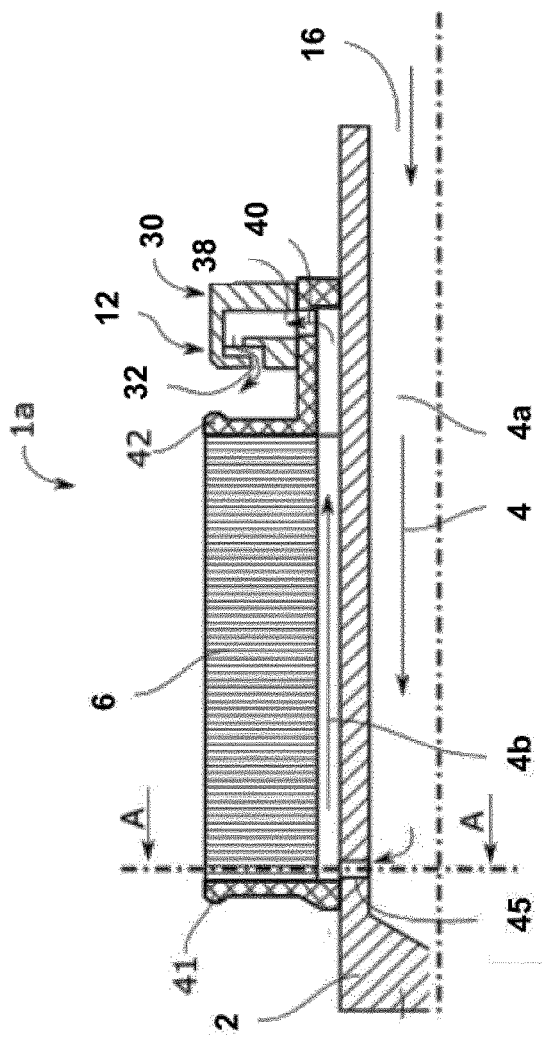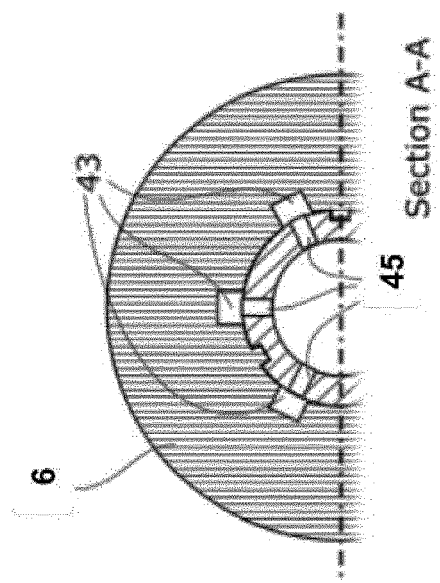
FIG 11

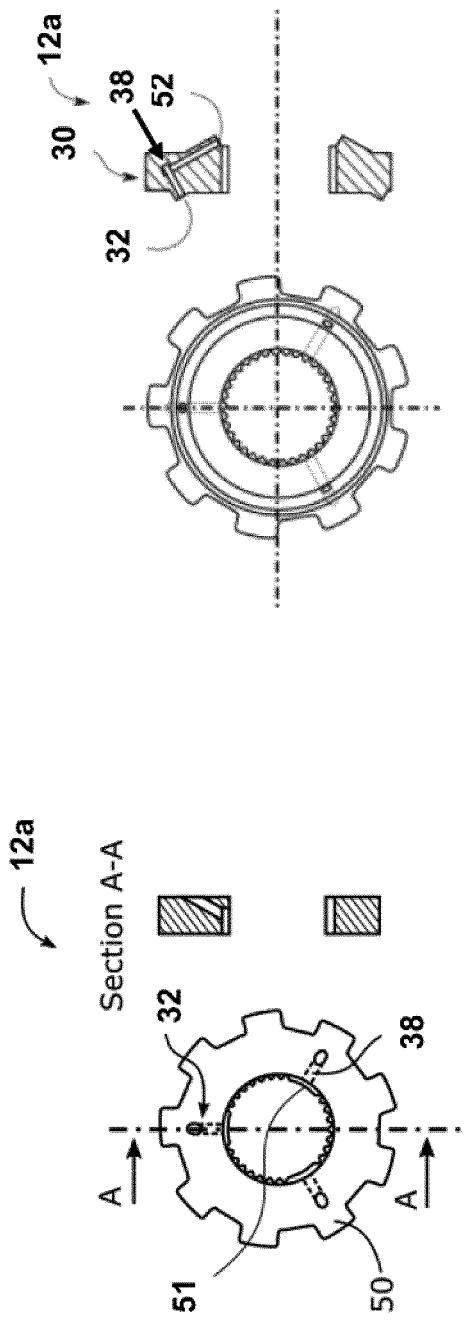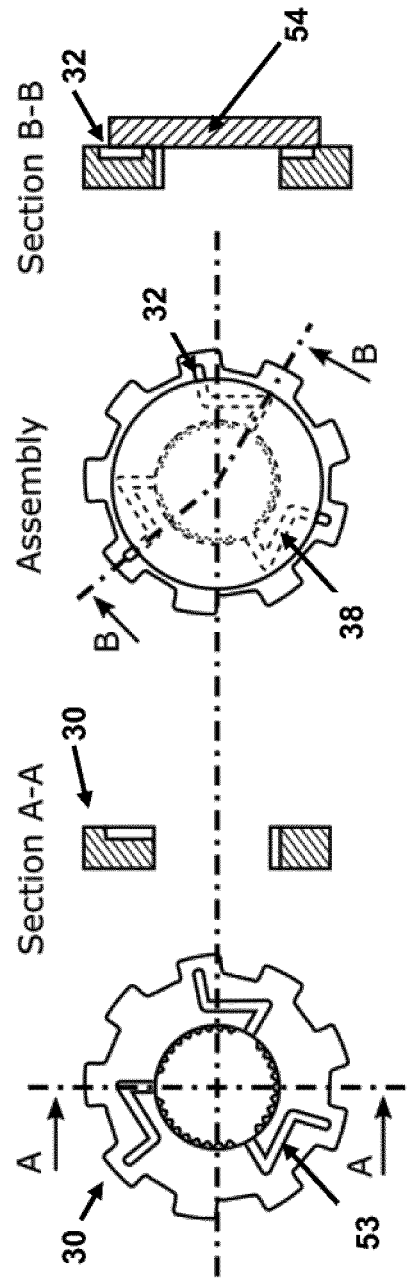

MOTOR AND METHOD FOR COOLING A MOTOR

CROSS-REFERENCE TO RELATED APPLICATIONS

This application is the U.S. National Stage of PCT/EP2020/088055, filed Dec. 30 2020, which claims priority to Belgium Patent Application No. 2019/6010, filed Dec. 31, 2019, the contents of each of which are incorporated herein by reference in their entireties.

FIELD OF THE INVENTION

The invention relates generally to cooling of a motor.

BACKGROUND TO THE INVENTION

Motors are considered to be machines having a rotor shaft that rotates when the motor is in operation, such as an electric machine or a gas turbine etc. An electric machine typically comprises a stator in which a rotor is rotationally mounted. The rotor is provided with a rotor shaft. A gas turbine comprises a rotor shaft that is cooled during operation.

Typically, for cooling purposes the rotor shaft is at least partly hollow and comprises a cooling channel that is arranged to receive cooling fluid. The cooling fluid absorbs heat from the hollow rotor shaft through conductive and/or convective heat transfer, thus cooling the hollow rotor shaft. The cooling channel may have an outlet via which cooling fluid leaves the cooling channel. The cooling fluid is recollected in a fluid reservoir, for example a sump. Typically, an electric pump is provided that pumps the cooling fluid from the fluid reservoir into the cooling channel. Also, when in stand-still of the electric machine, the cooling fluid runs out of the cooling channel and the cooling channel is emptied and filled by air. When the electric machine starts running again and the rotor starts rotating, the pump first needs to fill the channel with coolant, and the air that was in the cooling channel is to be driven out of the cooling channel. This may generate some noise as the air and the coolant may be mixed. During this start-up phase, the cooling is also rather inefficient due to the presence of air and/or air bubbles that need to be removed first.

There is a need for a cooling system of a motor that is less costly and/or may require less space, while providing an efficient cooling of the motor.

SUMMARY OF THE INVENTION

According to an aspect of the invention, there is provided a motor comprising a rotor shaft comprising a cooling channel having at least one inlet for receiving cooling fluid, and at least one outlet at an outer side of the rotor shaft arranged to allow cooling fluid to flow out of the cooling channel, wherein the outlet of the cooling channel is provided at a same end of the rotor shaft as the inlet of the cooling channel, the motor further comprising at least one outlet section fluidly connected to outlet of the cooling channel and arranged to allow cooling fluid to flow out of the cooling channel, wherein the outlet section comprises an outlet opening, wherein the radial position of the outlet opening, measured from a rotational axis of the rotor shaft, is larger than a radial position of the cooling channel inside of the rotor shaft and wherein the at least one outlet section comprises an outlet channel arranged to fluidly connect the outlet of the cooling channel to an exterior of the rotor shaft wherein a majority of the outlet channel is arranged in a radial direction of the rotor shaft. By providing the outlet section that is fluidly connected to the cooling channel in the rotor shaft, but the outlet opening of which provided at an outer radius of the rotor shaft, centrifugal forces are acting on the fluid in the outlet and it can be obtained that the outlet section has a suction function. The outlet section then can suck the cooling fluid from the cooling channel without the need for a separate electric pump. In operation, the rotation of the rotor shaft, generates a centrifugal force on the cooling fluid. By providing the outlet opening at a larger radial distance from the rotational axis of the rotor shaft than the cooling channel through which the cooling fluid passes, a pressure difference is generated. This pressure difference provides for the suction of the cooling fluid. The cooling fluid is, during operation, sucked towards the outlet opening, thus a separate pump for pumping the cooling fluid can be obviated. Since there is no pump needed anymore for pumping the cooling fluid, the cooling system for the motor can be more simple and more cost effective. By providing a majority the outlet channel in a radial direction of the rotor shaft, cooling fluid flowing through the outlet channel is sped up resulting in cooling fluid leaving the outlet channel in a radial direction and with a speed sufficiently high to splash the cooling fluid against coil windings of a stator of the motor. The outlet of the cooling channel is provided at a same end of the rotor shaft as the inlet of the cooling channel. To allow the cooling fluid to pass over approximately the axial length of the rotor shaft, the cooling channel may then be provided as having an inner channel and an outer channel that is concentrically arranged around the inner channel. At the end of the rotor shaft opposite the inlet end, the inner channel and the outer channel are fluidly connected, e.g. by means of radial bores in the rotor shaft, to each other to allow the cooling fluid to flow from the inner channel to the outer channel. The outer channel thus may be considered as the return channel for the cooling fluid. Typically, the inner channel comprises the inlet that is fluidly connected with the fluid reservoir and the outlet channel comprises the outlet section with the outlet opening at the same end as the inlet is provided. This additionally saves space and provides for a compact configuration of the cooling system, with cooling fluid reservoir, inlet, and outlet opening.

Advantageously, the cooling channel has an inlet that is fluidly connected to a fluid reservoir, typically a sump in which the cooling fluid is collected. Due to the outlet opening being at a larger radius than the cooling channel, a suction function can be provided allowing the outlet section to suck cooling fluid via the cooling channel from the cooling fluid reservoir. As such, a separate electric pump can be obviated, which is advantageous in view of costs and/or use of space in the powertrain and reduces the risks of cavitation related with a separate electric pump. Also, the cooling may become more efficient, as the suction effect may be higher with a higher rotational speed, as the pressure difference between inlet and outlet due to centrifugal forces increases with speed. Typically, losses of the motor and/or heat generation of the motor increase with rotational speed, as well, leading to a cooling mechanism, that delivers efficient cooling only when needed, namely more cooling fluid at higher rotational speeds.

Advantageously, the fluid reservoir is elevated with respect to the cooling channel. By providing the cooling fluid reservoir at a position that is higher than the cooling channel, in particular than the inlet of the cooling channel, when the rotor shaft is stationary, the cooling fluid may flow into the cooling channel, and, as such, the cooling channel can be pre-filled in stand-still. For example, upon starting of the rotation from stand still, the air present in the cooling channel may be gradually sucked out of the cooling channel, while coolant is being sucked in. By providing an elevated reservoir that is filled with cooling fluid, when the motor is started may be used to accelerate the filling process of the cooling channel. There may thus be less mixing and/or interference between air and/or coolant, thus reducing noise and improving efficiency.

Advantageously, the cooling fluid reservoir is passively filled by fluid splash of a rotating component present in a same housing as the rotor shaft, preferably, the rotating component may be a gear. For example, the reservoir can be filled passively with cooling fluid that is splashed around or upwards by one or more gears present in the same housing as the rotor shaft. The gears can be directly or indirectly coupled to the rotor shaft. Herewith no extra energy, e.g. by an actively operable pump, is required to redirect the fluid from the electric motor assembly to the reservoir. This additionally provides for a cost effective and space efficient cooling system.

When the motor is an electric machine, having a rotor mounted to the rotor shaft and a stator provided around the rotor, the cooling system of the electric machine can thus be provided without an additional pump. Therefore an electric pump, which is typically present in known cooling systems, can be obviated in the cooling system according to the invention. The cooling system can thus be based on gravitational energy, with the cooling fluid reservoir elevated with respect to the inlet of the cooling channel, on centrifugal energy, with the outlet opening at a larger radial distance than the inlet, and on the splashing of cooling fluid to fill the reservoir.

Alternatively, the outer channel can be provided outside of the rotor shaft and a rotor shaft wall between the inner channel, inside of the rotor shaft and the outer, return, channel outside of the rotor shaft. This can be advantageous in configurations where the rotor shaft may have a limited diameter. Alternatively, such a configuration can be advantageous in an electric machine. The outer channel can then e.g. be provided as multiple axial grooves in the rotor pack, thus providing for a more efficient heat transfer from the rotor stack to the cooling fluid.

Advantageously, the cooling channel comprises a cooling rib. By providing a cooling rib, the area with which the cooling fluid comes into contact is larger and thus the convective heat transfer may increase, thus providing for a more efficient and/or effective cooling. When the cooling channels comprises an inlet channel and an outlet channel, the cooling rib can either be provided in the inlet channel or in the outlet channel.

Advantageously, the cooling rib may comprise an inner channel and an outer channel separated from the inner channel, wherein the inner channel is fluidly connected to the inlet of the cooling channel and wherein the outer channel is fluidly connected to the outlet of the cooling channel, wherein cooling rib may further comprise at least one cooling rib opening arranged to fluidly connect the inner channel and the outer channel, wherein the at least one cooling rib opening is arranged near an opposite end of the rotor shaft as the inlet and outlet of the cooling channel. As such, an inner channel is provided that is fluidly connected with an outer channel, and where the inner channel is used as a first part of the cooling channel, bringing the coolant from the inlet opening towards an opposing end of the rotor shaft, and where the outer channel is used as a second part of the cooling channel and bringing the coolant back from the axial opposing end of the rotor shaft towards the outlet of the cooling channel, hence enabling a configuration where the outlet opening is provided at a same end of the rotor shaft as the inlet. The inner channel allows for the cooling fluid to flow in one direction, and in the outer channel flows the cooling fluid in the other direction towards the outlet.

In an embodiment, the cooling rib may comprise an inner tube where fluid can flow, and which forms the inlet channel. Said inner tube has outwardly extending protrusions such as fins or spacers on the outside that keep it centered inside a rotor shaft cavity. Fluid may exit the inner tube and enter the space between inner tube and the rotor shaft cavity to return. Hence, said space between the inner tube of the cooling fin and the rotor shaft cavity forms the outlet channel.

The outwardly protrusion may be spring biased towards an inner wall of the rotor shaft, as to increase the contact surface with the inner wall of the rotor shaft, as well as centering it in the rotor shaft. The cooling rib outwardly protrusions that keep it centered may be designed to be flexible and slightly oversized, functioning like a spring to build up clamping forces during assembly. That clamping forces keep the cooling rib in place during operation of the electric machine.

The cooling rib may be manufactured from a material with higher thermal conductivity than the rotor shaft material, preferable an aluminium alloy or a copper alloy. Also, for cost saving reasons, it may be produced as extrusion profile, preferably extruded aluminium.

The shape of the cooling rib protrusions, such as fins or ribs, is designed to allow proper centering and clamping, but also for a large contact surface with the rotor shaft as to allow heat flow from the rotor shaft into the cooling rib. Furthermore, it should provide a large contact surface with the coolant flow outside the inner tube. There should be sufficient fins connected to the inner tube, preferably three or more, as to provide heat conduction towards the inner tube, where the coolant can absorb heat, as well. Finally, for an extrusion profile, minimum clearances of 3 mm and wall thicknesses of 1.5 mm need to be respected.

Advantageously, the outlet section comprises a flow restriction. By providing a flow restriction in the outlet section, back pressure in the cooling channel is increased, thereby reducing the flow of the cooling fluid towards the outlet opening. The flow restriction allows the cooling fluid to leave the outlet section but restricting the outlet flow. Such a flow restriction creates a backpressure, which decreases the volumetric flow, such that the right amount of flow at the maximum rotational speed can be tailored to the cooling demand. Such a flow restriction also decreases the under-pressure generated within the cooling channel and can be used to prevent cavitation within the coolant channel, which would otherwise decrease the cooling performance. The flow restriction can for example be provided as a smaller cross-sectional area in the outlet section than the cooling channel or than another part of the outlet section. To provide for the smaller cross-sectional area in the outlet section, the outlet section can locally be narrowed, or a plate or rib can be provided that provides for the narrowing of the cross-sectional area in the outlet section. A smaller cross sectional area in the outlet section may locally result in an increase of both dynamic pressure and friction by viscous forces at the smaller cross sectional area. The increase of friction at the smaller cross sectional area may, just as the part of the outlet section, decrease the flow rate of cooling liquid in the cooling channel.

An other effect of the smaller cross sectional area at the outlet is the increase in backpressure which prevents cavitation. Due to the flow acceleration towards the outlet, a higher pressure builds up throughout the cooling channel. Hence, centrifugal forces cannot accelerate a portion of the liquid towards the outlet, leaving partial vacuum or vapor bubbles in-between. This cavitation phenomenon decreases the overall effectiveness of the centrifugal pumping effect, as pressure cannot decrease further and the portion of liquid on the other side of a vapor bubble is only accelerated with the pressure difference between inlet and vacuum. The inlet flow will thus not benefit from additional centrifugal forces acting on the outlet, if a straight outlet hole without flow restriction is used and cavitation occurs from a given rotational speed onwards. However, since the centrifugal acceleration is still active, the shaft torque loss and with it the power losses of the pumping mechanism will still increase with rotational speed. This is why an outlet restriction or nozzle shaped outlet increases the overall effectiveness of the pumping mechanism.

It will be appreciated that both the increase of dynamic pressure and friction by viscous forces at the smaller cross section can be present regardless of the rotational speed of the shaft. It will however be appreciated that both effects increase with increasing flow, weakening the effect of increasing flow with rotational speed.

Advantageously, the at least one outlet channel of the at least one outlet section is provided as a radially extending bore. As such, the outlet section can be radially fluidly connected in a radial direction with the outlet through a wall of the rotor shaft. More advantageously, the internal diameter of the radially extending bore is decreasing in an outwardly direction. As such, the radially extending bore may have a tapered shape in a direction away of the rotor shaft. The internal diameter of the outer end of the radial bore is smaller than the internal diameter of the inner end of the radial bore, thereby providing for a flow restriction for regulating the cooling fluid that is being outputted via the outlet section.

Advantageously, a ring is provided engageable with an outer surface of the rotor shaft, wherein the ring comprises the at least one outlet section. By providing a ring that comprises the outlet section, assembly of the outlet sections to the rotor shaft can become relatively easy. Preferably, the ring has a circumferential recess at an inner side thereof. Providing such inner circumferential recess allows that the ring does not need to be positioned aligned with the outlets of the rotor shaft. Via the recess, the cooling fluid can be distributed over the recess and may further access the outlet sections.

Alternatively and/or additionally, the outlet section may comprise a nozzle. Such a nozzle may achieve the same or similar effect as the smaller cross sectional area, and may be used for additional cooling applications, like coolant being sprayed on end windings that extend axially from the laminated irons of a stator of an electric machine or to other components, such as e.g. gears, provided, typically in the same housing as the rotor shaft, preferably at or near the outlet opening.

Advantageously, the nozzle can be positioned adjacent to the outlet opening. Preferably, the nozzle can be positioned at the outlet opening, such that the nozzle may form the outlet opening. Positioning the nozzle at the outlet opening may provide for an easy way to construct the outlet section of the cooling channel. The nozzle may also provide the smaller cross sectional area, exempting the need to implement a separate smaller cross sectional area in the outlet section, thus resulting in a outlet section that can be easier to manufacture.

Advantageously, a nozzle adjacent the outlet opening may be arranged to face backward with respect to its normal rotational movement direction, as to decrease the momentum of fluid particles leaving the nozzle. This may reduce the reaction torque of the rotor shaft that is inflicted by the cooling mechanism as compared to a similar system where flow is restricted using a small cross-section that is dominated by frictional forces. The nozzle may be provided in an outlet opening for spraying, or the outlet section itself may be shaped as a nozzle, such as a tapered radial bore with an outwardly decreasing cross-section, merely having the effect of a flow restrictor.

The stator of the electric machine may comprise outwardly extending end windings, at least at one end of the stator. The outlet opening then advantageously may be configured to spray cooling fluid to the extending windings for cooling of the said end windings. Thus additional cooling to the stator may be provided.

In another embodiment, a cooled surface can be provided at or near the outlet opening against which the cooling fluid exiting the outlet opening is sprayed to cool down the cooling fluid for further use. The cooled cooling fluid may then flow back to the reservoir where it can be re-used in the cooling system.

Advantageously, a part of the outlet section is at a greater distance from the rotational axis rotational axis of the rotor shaft than the outlet opening, forming a siphon. By providing such a part at a larger distance in the outlet section, emptying of the cooling channel when the rotor shaft has stopped rotating may be somewhat slower. This may result in an amount of cooling fluid that remains in the cooling channel, in particular in the outlet section of the cooling channel. Another advantage of such a part in the outlet section can be that, while the rotor shaft is turning, ambient fluid can be prevented from entering into the cooling channel. The centrifugal pressure in the part of the outlet section may be larger than the centrifugal pressure at the outlet opening, being at a smaller radial distance from the rotational axis of the shaft. This may result in, at least above a certain rotational speed of the shaft, that the total pressure being at its highest point at the said part of the outlet section and the total pressure decreasing between the said part of the outlet section and the outlet opening. The decreasing total pressure near the outlet opening may also prevent ambient fluid from entering into the cooling section. The outlet section hence comprises a siphon, that is capable of keeping a portion of fluid, when the rotational speed is high enough and sealing the outlet from gas ingress from the ambient environment. When the rotor shaft is turning, the said part of the cooling section may remain filled with cooling fluid, thus also preventing air to enter the cooling section and further, the cooling channel. This may reduce noise, and may increase efficiency of the cooling.

Advantageously or optionally, the part of the outlet section can be U-shaped, with a bridge between legs of the U-shape as being the said part at a larger radial distance from the rotational axis of the rotor shaft than the outlet opening. The U-shaped section then forms the siphon, and provides for the siphon-effect in which an amount of cooling fluid may remain in the outlet section.

Additionally or alternatively a check valve may be installed in the outlet section, which opens only with sufficient fluid pressure from the inside. Such a check valve would effectively prevent ambient air from entering the suction pump mechanism. It can also serve to keep oil inside the rotor shaft at low rotational speed and during stand-still. If mounted in a radial way, the centrifugal forces acting on the valve body add up to the fluid pressure forces, and as such the opening characteristic is dependent on the speed of the rotor shaft. Therefore, a check valve yields another means to control the fluid flow through the shaft in dependence of the rotor speed. Another advantage is the availability of check valves as standard parts, which may lead to a more cost effective assembly as compared to an own design with siphon.

Alternatively, a part of the cooling channel fluidly connecting the channel inlet and the channel outlet the outer channel returning the fluid from the opposite shaft end to the outlet section may be formed between axially extending recesses on the inner surface of the lamination stack and the rotor shaft outer surface. By providing a part of the cooling channel between axially extending recesses on the inner surface of the lamination stack and the rotor shaft outer surface, direct cooling of the lamination stack by the cooling fluid is achieved, increasing the overall cooling efficiency of the motor.

Alternatively, the outlet section is integrated in the rotor shaft, comprising drilled channels connecting the cooling channel with the at least one outlet opening.

The rotor shaft may be provided as two shaft parts that are engageable to each other. For engaging the two shaft parts an axially movable teethed spline connection may be used, which allows axial movement but not rotational movement between the two shaft parts. Between the teeth of the connection, channels can be provided to allow cooling fluid to pass through. Practically, this can be achieved by omitting at least one tooth of a toothed spline connection between two shafts, the omitted tooth thereby forming the outlet channel. As an alternative, the two shaft parts can be connected using a threaded connection. Between the treads of the threaded connection, channels can be provided to allow cooling fluid to pass through. Practically, this can be achieved by omitting at least on thread of the threaded connection, the omitted thread forming the outlet channel. Advantageously, a final thread or tooth end of such threaded or spline connection is at a larger radial distance from the rotational shaft acting as the outlet opening providing for the suction effect of the cooling fluid. As such, in an advantageous manner, the threaded or spline connection can be integrated into the cooling system, being fluidly connected to the cooling channel provided in the shaft parts, providing for a compact configuration of the cooling system. Now, not only a pump can be obviated but also any additional element or any additional interference with the rotor shaft for providing the outlet section, can be obviated.

According to another aspect of the invention, there is provided an electric or hybrid vehicle transmission comprising, an electric machine as described hereinabove wherein the cooling channel of the rotor shaft is arranged for connection to a cooling system of the electric or hybrid vehicle transmission to allow a cooling fluid to flow into the channel.

The motor, such as an electric machine, can be comprised in a vehicle powertrain. Advantageously, then, the outlet section can be integrated in a park lock wheel which is connectable to the rotor shaft. The park lock wheel may, to that end, comprise a plurality of holes that are fluidly connected to the cooling channel of the rotor shaft which holes are fluidly connected to at least one outlet opening to allow cooling fluid to exit the cooling channel. The outlet section in the park lock wheel may thus comprise the holes provided in the park lock wheel. The outlet opening may thus be at a larger radial diameter than the inlet of the cooling channel, and the outlet section may additionally also comprise a flow restriction as described above.

According to another aspect of the invention, there is provided a method for cooling of a machine, including providing a machine having a rotor with a rotor shaft and a stator mounted over the rotor, the rotor shaft having a cooling channel having at least one inlet for receiving cooling fluid, and at least one outlet at an outer side of the rotor shaft arranged to allow cooling fluid to flow out of the cooling channel, wherein the outlet of the cooling channel is provided at a same end of the rotor shaft as the inlet of the cooling channel, the motor further comprising at least one outlet section fluidly connected to the outlet of the cooling channel and arranged to allow cooling fluid to flow out of the cooling channel, wherein a radial position of the at least one outlet section, measured from the rotational axis of the rotor shaft, is larger than a radial position of the cooling channel inside of the rotor shaft and wherein the at least one outlet section comprises an outlet channel arranged to fluidly connect the outlet of the cooling channel to an exterior of the rotor shaft wherein a majority of the outlet channel is arranged in a radial direction of the rotor shaft.

BRIEF DESCRIPTION OF THE FIGURES OF THE DRAWING

The disclosure is further elucidated by means of a schematic drawing. In the drawing the following figures are shown.

FIGS. 3a, 3b, 3c, 3d and 3e show example schematic embodiments of an outlet section according to the invention FIG. 3f is a schematic perspective view of a rotor shaft with a ring comprising the outlet section of FIG. 3d. FIG. 3g is a schematic perspective view of a ring comprising the outlet section of FIG. 3e.

FIG. 4 shows an example of an outlet section at a threaded or spline connection between two shaft parts.

FIGS. 10a, 10b, 10c, 10d, 10e and 10f show embodiments of cooling fins according to the invention.

FIG. 11 shows a cooling channel, where the return channel is formed on the outside of the rotor shaft, in channels in-between the rotor shaft and the laminated iron of the rotor stack of an electric machine.

FIG. 12 shows an outlet opening integrated in a park lock wheel of a transmission.

DETAILED DESCRIPTION

The figures are given by way of schematic representations of embodiments of the disclosure. Similar features are denoted with the same or similar reference numbers. The figures are not drawn to scale and are schematic only.

Figure 1:
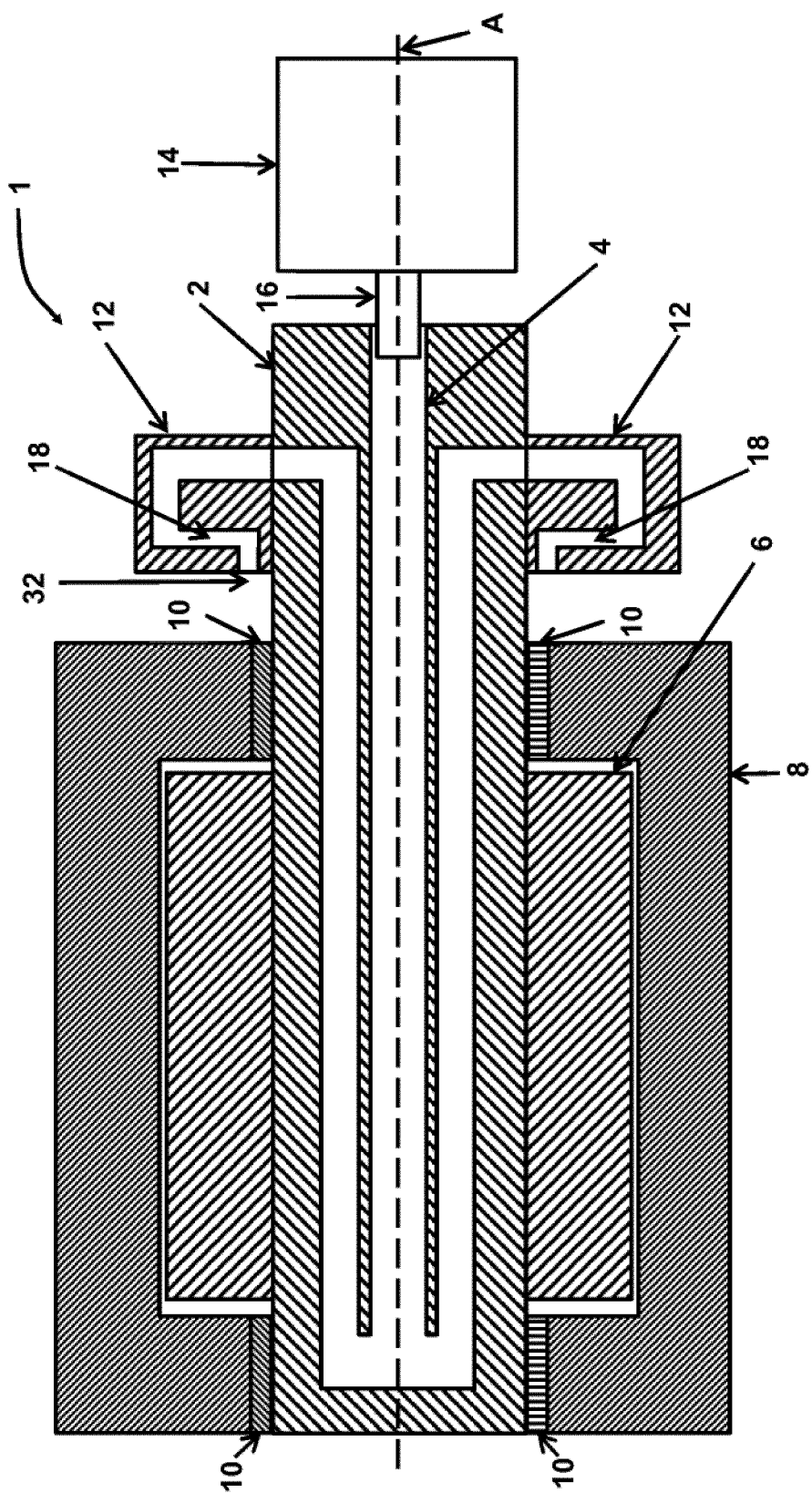
FIG. 1 shows a view of a cross section of an embodiment of the invention.

FIG. 1 shows a schematic view of a cross section of an embodiment of the invention. FIG. 1 shows an electric machine 1 comprising a rotor shaft 2 comprising a cooling channel 4. The electric machine 1 further comprises a rotor 6 fixedly connected to the shaft 2, for example by an interference fit or by a shaft key way. The rotor 6 and shaft 2 are rotatably mounted in a stator 8 using bearings 10. More bearings might be present, for example at the end of the shaft 2 extending outside of the rotor 6, but these are not shown as not to overcomplicate the figure. The electric machine 1 further comprises two outlet section 12. The outlet section 12 is provided as here a ring like element mounted on the rotor shaft 2 and engageable to an outer wall of the rotor shaft 2. The cooling channel 4 is fluidly connected to a cooling fluid reservoir 14 by a cooling fluid inlet 16. The inlet 16 can remain stationary while the shaft 2 is rotating, for example by a seal, not shown, such as a lip seal or a labyrinth seal, mounted between the inlet 16 and the shaft 2, preventing cooling fluid leaks.

The electric machine 1 generates heat during operation. The reservoir 14 provides cooling fluid which flows from the reservoir 14, through the inlet 16, into the channel 4. As illustrated in FIG. 1, the channel 4 is divided in an inner part and an outer part, fluidly connected at the side of the shaft 2 opposite to the inlet 16. The cooling fluid flowing through the channel 4 absorbs heat from the shaft 2 by conductive and convective heat transfer, thus cooling the shaft 2 and the rotor 6.

An outlet opening 32 is positioned on a larger radius than the cooling fluid inlet 16. When the rotor shaft 2 is rotating, centrifugal forces cause a pressure difference between the outlet opening 32 and the inlet 16. The pressure difference allows for a suction function allowing the outlet section 12 to suck cooling fluid from the reservoir 14. As such, a separate electric pump can be obviated. An increase in rotational speed results in increasing centrifugal forces acting on the cooling fluid. The increasing centrifugal forces result in an increasing pressure difference between the inlet 16 and the outlet opening 32, thus increasing the influence of the suction function.

The outlet section 12 comprises an outlet opening 32 allowing cooling fluid to exit the cooling channel 4. As shown on FIG. 1, a part 18 of the outlet section 12 is at a greater distance from a rotational axis A than the outlet opening. The pressure in the part 18 of the outlet section 12 at a greater distance from the rotational axis A is higher than the pressure in the outlet opening 32 when the shaft 2 is rotating, due centrifugal forces acting on the cooling fluid. The hydrostatic pressure caused by centrifugal force prevents ambient air from entering the cooling channel 4 through the outlet opening 32. Preventing ambient air or other fluids to enter the cooling channel 4 through the outlet opening is beneficial, as ambient air or other fluids could influence the suction function of the outlet section 12, and typically have lower heat exchange characteristics than the cooling fluid.

FIG. 1 illustrates the hollow shaft 2 with the cooling channel 4 and the outlet sections 12 as one solid object. It will however be appreciated that the hollow shaft 2 may consist of multiple connectable components. The outlet sections 12 can for example be arranged in a separate ring-like structure arranged to be mounted on the hollow shaft 2.

Figure 2:
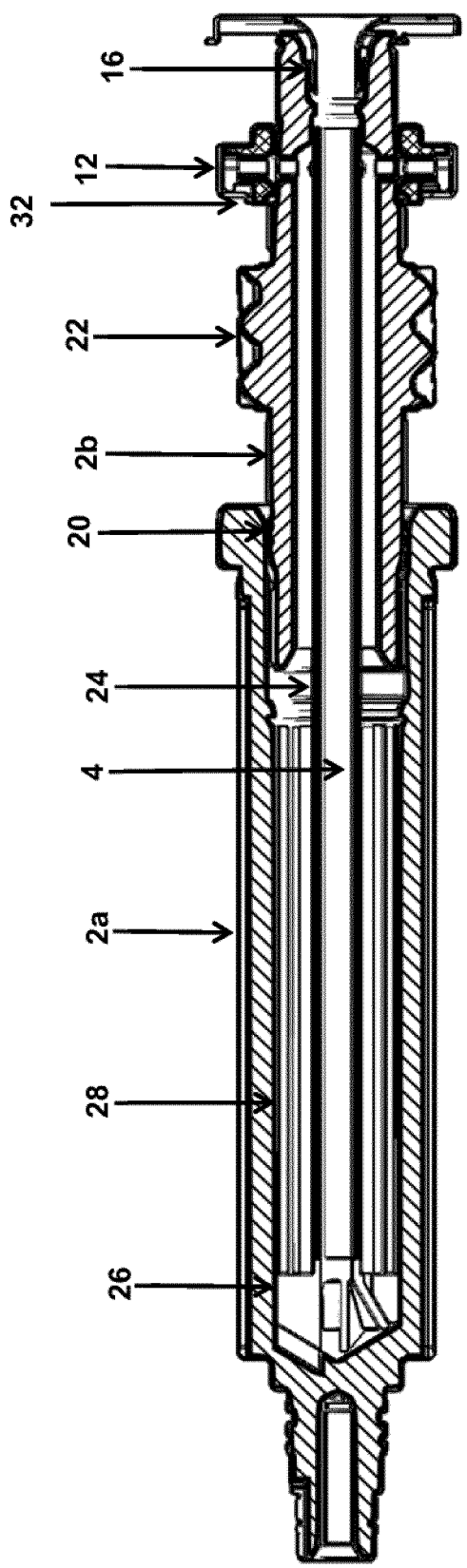
FIG. 2 shows a view of a cross section of an example embodiment of a hollow shaft of the invention.

FIG. 2 shows a view of a cross section of an example embodiment of a hollow shaft 2 of the invention. As illustrated in FIG. 2, the hollow shaft 2 is divided in a first shaft segment 2a and a second shaft segment 2b. The first shaft segment 2a may be arranged to fixedly connect with the rotor 6. The second shaft segment 2b can be arranged to fixedly connect to the first shaft segment 2a, for example by a threaded connection 20 or a splined shaft connection 20. The splined shaft connection 20 may allow axial movement of the second shaft segment 2b with respect to the first shaft segment 2a, and provides for rotational locking of the first shaft segment 2a with the second shaft segment 2b. The second shaft segment 2b may include a transmission gear 22, arranged to transfer torque from the shaft 2 to for example a transmission. The second shaft segment 2b further includes the outlet section 12 and the inlet 16. The cooling channel 4 extends along the first shaft segment 2a and the second shaft segment 2b and is divided in an inner part and an outer part by a separation element 24, such as a tube 24. The first shaft segment 2a further includes a fixing component 26 and a heat exchanger 28. The heat exchanger 28 is arranged in the outer part of the cooling channel 4 extending along the first shaft segment 2a and can for example be a set of fins. The heat exchanger 28 increases the contact surface between the first shaft segment 2a and the cooling fluid, allowing for an improved heat transfer between the first shaft segment 2a and the cooling fluid. The heat exchanger 28 is further arranged to prevent radial movement of the tube 24, preventing the tube 24 to bend away from the rotational axis of the shaft 2 while turning and thus creating an imbalance. The fixing component 26 is arranged to prevent axial movement of the tube 24. The fixing component 26 is further arranged to guide cooling fluid from the inner part of the cooling channel 4 to the outer part of the cooling channel 4. The fixing component 26 and/or the heat exchanger 28 can be optimized to minimize pressure losses as to optimize the pressure difference between the inlet 16 and the outlet section 12. A significant pressure loss over the fixing component 26 or the heat exchanger 28 might influence the suction function of the outlet section 12.

The embodiment of the hollow shaft 2 as illustrated in FIG. 2 may provide for a method as how to assemble a hollow shaft according to the invention. The heat exchanger 28 and the fixing component 26 can for example be mounted on the tube 24 as a first step. This combination of the tube 24, the fixing component 26 and the heat exchanger 28 can then be positioned inside the first shaft segment 2a, with the tube 4 extending partially outside of the first shaft segment 2a. The second shaft segment 2b can now be mounted over the tube 4 and connect to the first shaft segment 2a using the connection 20. Next the outlet section 12 can be mounted on the second shaft segment 2b. The outlet section 12 could also be mounted on the second shaft segment 2b before connection the second shaft segment 2b to the first shaft segment 2a. The assembly described here above can also take place when the first shaft segment 2a is already rotatably connected to the stator and/or fixedly connected to the rotor.

FIGS. 3a, 3b, 3c, 3d and 3e show four different embodiments of examples of the outlet section 12. Each of the FIGS. 3b, 3c 3d and 3e show an outlet section 12 wherein at least a part of the at least one outlet section 12 is at a larger distance from a rotational axis of the rotor shaft 2 with respect to the inlet of the cooling channel 4.

FIG. 3a shows an outlet section 12 wherein an internal cross sectional area of the outlet section 12 is smaller than an internal cross sectional area of the cooling channel 4 inside of the rotor shaft 2. FIG. 3a shows an outlet section 12 comprising an outlet section body 30 and outlet openings 32. The outlet section 12 is shown as a separate ring-shaped part arranged to be mounted onto the hollow shaft 2. In an other embodiment of the invention the outlet section 12 can be a part of the hollow shaft 2. The outlet openings 32 are shown here as straight holes integrated in the rotor shaft 2, which can for example be manufactured by drilling. The internal cross sectional area of the outlets 32 can be constant over the length of the outlet section 30. This design does not comprise an internal cross section within the outlet section on a larger radius than the outlet opening, and therefore, ambient fluid, e.g. air may be able to enter into the outlet section.

FIG. 3b shows a schematic cross section of an outlet section 12 comprising an outlet section body 30, outlets 32 and an outlet section lid 34. The outlet section body 30 is shown as a separate ring-shaped part arranged to be mounted onto the hollow shaft 2. In an other embodiment of the invention the outlet section 12 can be a part of the hollow shaft 2. The outlet section body 30 can for example be formed by techniques such as turning and drilling. The outlet section lid 34 is arranged to be mounted over the outlet section body 30. The outlets 32 can be formed between the outlet section body 30 and the outlet section lid 34. The outlet section 12 comprises a circumferential recess 39. The circumferential recess 39 is present around the entire inner circumference of the outlet section 12. The circumferential recess 39 collects fluid leaving the cooling channel 4 and guides fluid to an outlet channel 38 of the outlet section 12. Together with the outlet section body 30, the outlet section lid forms an internal cross section on a larger radius than the outlet opening 32. This may prevent ambient fluid, e.g. air from entering into the outlet section 12. FIG. 3F shows a perspective view of the outlet section 12 shown in FIG. 3b. FIG. 3c shows a schematic cross section of an outlet section 12 comprising an outlet section body 30 and outlets 32. The outlet section body 30 is shown as a separate part arranged to be mounted onto the hollow shaft 2. In an other embodiment of the invention the outlet section 12 can be a part of the hollow shaft 2. The outlets 32 are shown here as having two straight holes connected with each other at an angle. The two straight holes can for example be formed by drilling holes in the outlet section body 30. The angle can be as such that at least a part of the at least one outlet section 12 is at a larger distance from a rotational axis of the rotor shaft 2 than the outlet opening The internal cross sectional area can be constant in FIG. 3c. The outlet section 12 comprises a circumferential recess 39. The circumferential recess 39 is present around the entire inner circumference of the outlet section 12. The circumferential recess 39 collects fluid leaving the cooling channel 4 and guides fluid to an outlet channel 38 of the outlet section 12.

FIG. 3d shows a schematic cross section of an outlet section 12 comprising an outlet section body 30 and outlets 32. The outlet section 12 is shown here as a separate part arranged to be mounted at an end of the hollow shaft 2 as opposed to the embodiments shown in FIGS. 3a, 3b, 3c and 3e which can be mounted onto the hollow shaft 2. The outlets 32 have less corners than the embodiments shown in FIGS. 3b and 3c, which might result in a more laminar flow of the cooling fluid. A more laminar flow of the cooling fluid may achieve a stronger suction function than a more turbulent flow of the cooling fluid. Manufacturing of such a geometry might be performed with plastic 3D printing.

FIG. 3e shows a schematic cross section of an outlet section 12 comprising an outlet section body 30 and outlets 32. the at least one outlet channel 38 leading towards the outlets 32 is nozzle shaped, in order to place the smallest flow cross section at the outlet 32. This generates back-pressure and prevents cavitation from centrifugal force to happen inside the outlet channel. The outlet section 12 comprises a circumferential recess 39. The circumferential recess 39 is present around the entire inner circumference of the outlet section 12. The circumferential recess 39 collects fluid leaving the cooling channel 4 and guides fluid to an outlet channel 38 of the outlet section 12. FIG. 3G shows a perspective view of the outlet section 12 shown in FIG. 3e. In the ring multiple outlets 32 can be provided distributed circumferentially on the ring. Similar to the example of FIG. 3f the outlets 40 through the rotor shaft wall are provided as radial bores. Then, the outlet channels of the outlet section 12 are provided as radial bores as well, preferably as tapered bores with an outwardly decreasing cross-section. As such, the outlet channel of the cooling channel is substantially radially extending, and is being formed by the outlets 40 through the wall of the rotor shaft, the circumferential recess 39 of the ring of the outlet section 12 and the outlets 38 in the ring.

The example embodiments of the outlet section 12 illustrated in FIGS. 3b, 3c, 3d and 3e each show the outlet opening 32 at a same side of the outlet section 12. It shall however be appreciated that the outlet opening can be at any side of the outlet section 12, for example aiming the cooling fluid in a substantially axial direction towards the rotor, such as in FIG. 3b, in a substantially radial direction away from the hollow shaft 2, such as in FIG. 3a, in a substantially axial direction away from the rotor, in a substantially tangential direction or in any direction in between aforementioned directions.

The example embodiments of the outlet sections 12 illustrated in FIGS. 3a, 3b, 3c and 3e are arranged to be mounted onto the hollow shaft 2. FIGS. 3a, 3b and 3c show an increased internal diameter of the axial hole through which the hollow shaft 2 can extend. The increased internal diameter allows a larger tolerance when mounting the outlet section 12 onto the hollow shaft 2, thus reducing drawbacks resulting from a misalignment between the cooling channel 4 of the hollow shaft 2 and the outlets 32 of the outlet section 12.

The example embodiments of the outlet sections 12 illustrated in FIGS. 3a, 3b and 3c all show an outlet section 12 having a part 36 of the outlet section 12 that is at a larger radial diameter than the outlet opening 32, thus providing for a siphon creating the siphon-effect during rotation.

The outlet section 12 comprises the outlet channel 38 that is fluidly connected to the cooling channel 4 of the rotor shaft 2 that at another end ends in the outlet opening 32. In FIG. 3a, the outlet channel 38 is straight, but it can be curved or U-shaped such as e.g. shown in FIG. 3b or FIG. 3d. The outlet channel 38 can be integrally formed in the rotor shaft, or can be part of an outlet section 12 that is provided as an additional element on the rotor shaft. Many variants can be possible. In the outlet channel 38 a flow restriction can be provided to regulate the outlet flow in particular at higher rotational speeds. The flow restriction can e.g. be a part of the outlet channel 38 that has a smaller cross-sectional area than the rest of the outlet channel. Alternatively, the flow restriction can be the outlet opening 32 having a smaller cross-sectional area than the outlet channel 38.

FIG. 4 shows an alternative example of the outlet section 12. In this example, the rotor shaft 2 comprises two shaft parts 2a, 2b that are engaged with each other via the threaded or spline connection 70. The threaded or spline connection 70 comprises a few threads or teeth 71a, 71b that engage with each other to form a connection. In this connection, a channel 72, 73 is provided that fluidly connects the cooling channel 4 with the outlet opening 32. The channels 72, 73 may for example be established by intermittently providing the threads or teeth, or by providing recesses in the threads or teeth. Since at the final threads or teeth, here 71a, the channel 72, and the outlet opening 32 from that channel is at a larger radial position than the rotational axis at which the inlet of the cooling channel is connected, during rotation a suction effect is obtained due to the pressure difference caused by the centrifugal force. The cooling fluid is thus sucked out of the cooling fluid reservoir (not shown here). The outlet 32 may be positioned radially inward with respect to the radial position of the channels 72, 73. When rotating, such placement provides for higher fluid pressure inside the channels 72, 73 than in the outlet 32 and thus keeps a portion of fluid inside the channels and prevents ambient fluid from entering into the outlet section, hence creating a siphon. The cooling channel 4 here is provided with an inner channel 4a that is fluidly connected with the inlet, and with an outer channel 4b that is fluidly connected with the outlet. The inner channel 4a and the outer channel 4b are also fluidly connected to form the cooling channel. In the inner channel 4a the cooling fluid flows in one direction, and in the outer channel 4b the cooling fluid flows in the other, opposite direction towards the outlet, since the inlet and the outlet of the cooling channel are provided at the same side of the cooling channel.

Figure 5:
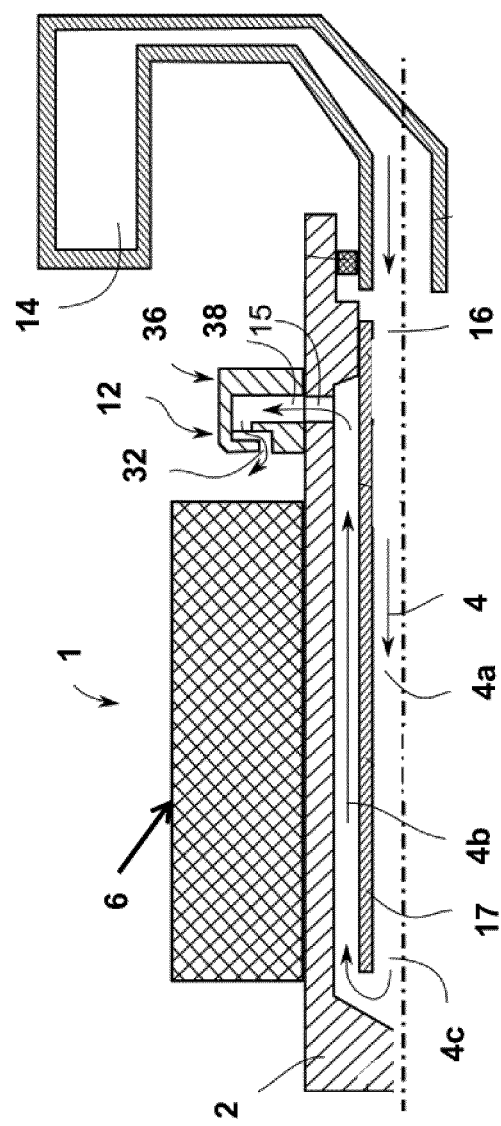
FIG. 5 shows an alternative embodiment to the example of FIG. 1.

In FIG. 5, an the outlet section 12 is provided as a separate element that is mounted to an outer side of the shaft 2. In the outlet section, the outlet channel 38 is provided, here with a U-shaped form having a part 36 at a larger radial position than the outlet opening 32 providing for the siphon-effect during rotation. Also, here, the cooling fluid reservoir 14 is provided at an elevated position with respect to the inlet 16, thereby providing for a pre-filling of the cooling channel 4 during stand-still of the rotor shaft 2 due to gravitational energy. Also shown in the example of FIG. 5 is that the cooling channel 4 has an inlet 16 at one end and that the outlet opening 32 is provided at the same end as the inlet 16. The cooling channel 4 comprises to that end an inner channel 4a and an outer channel 4b divided by a channel wall 17. The inner channel 4a and the outer channel 4b, comprising the return flow of the cooling fluid towards the outlet opening 32, are fluidly connected to each other at the end of the rotor shaft 2 opposite the inlet 16. The cooling fluid flows from the inner channel 4a to the outer channel 4b around the edge 4c of the channel wall 17. Alternatively, the outer channel 4b can be provided outside of the rotor shaft 2, e.g. as bores in the rotor laminate pack 6.

Figure 6:
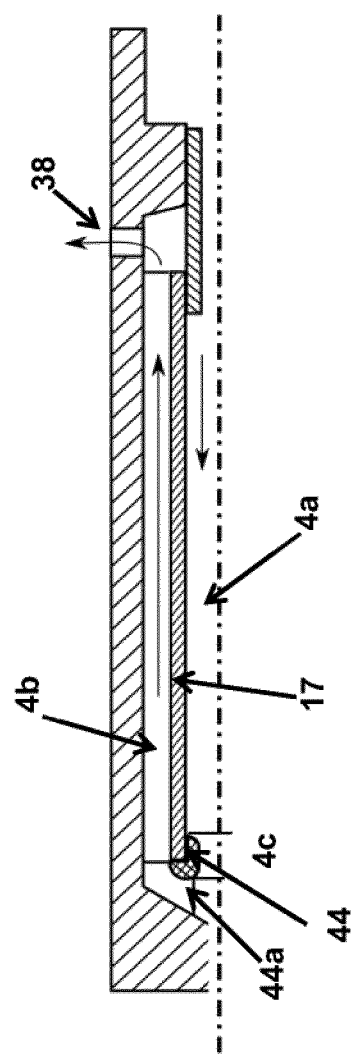
FIG. 6 shows an example of a rotor shaft with an outlet section.

In FIG. 6, the outlet section 12 is integrated in the rotor shaft 2, as a simple outlet channel 38. Of course, other examples of the outlet sections 12 can be integrally provided or formed in the rotor shaft. Here, the edge 4c is provided with a displacement 44 guiding the cooling fluid radially outward and reducing the risk on cavitation or other fluid flow phenomena deteriorating the fluid flow at the edge 4c. The fluid displacement member is preferably configured to generate an angular acceleration of the cooling fluid and is preferably configured to redirect the fluid from the inner channel towards the outer channel. It in fact helps the cooling fluid to make the sharp turn towards the outer channel. This angular acceleration can be facilitated by providing displacement member ribs 44a that are extending radially outward from the displacement member such that the fluid near the ribs is forced to follow the angular speed of the rotor. This may result in a more effective and efficient fluid flow of the fluid from the inner channel towards the outer channel. At least one displacement member rib may guide the fluid radially outward. This may result in an improved flow of the liquid from the inner channel towards the outer channel.

Figure 7:
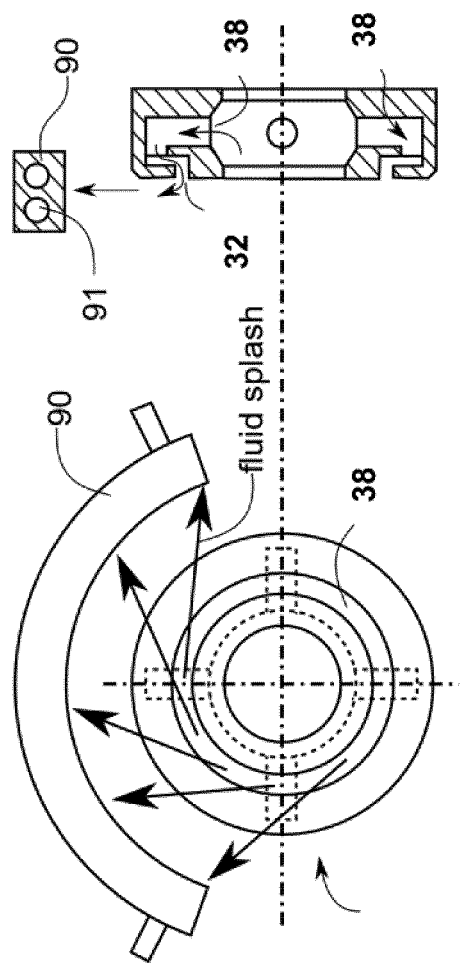
FIG. 7 shows an example of a cooling body near the outlet opening.

FIG. 7 shows a cooling body 90 that is positioned near the outlet opening 32 of the outlet section 12. The heated cooling fluid exiting the outlet opening 32 then splashes against the cooled body 90, thereby cooling the cooling fluid such that the cooling fluid can, once cooled, return back to the cooling fluid reservoir 14 for further use in the cooling system. The cooling body 90 can be provided with channels 91 via which a cooling fluid can be provided to cool the cooling body 90.

Figure 8:
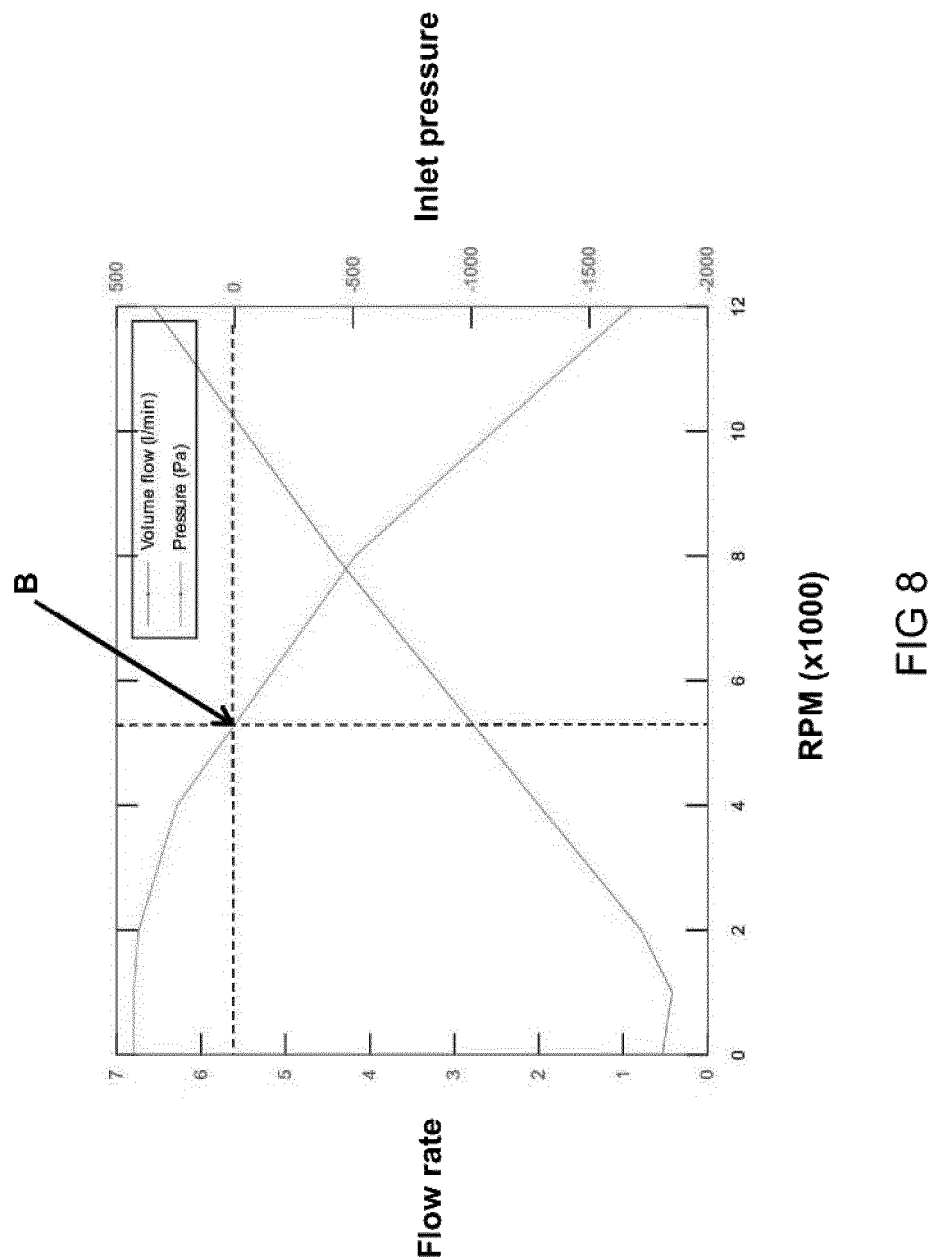
FIG. 8 shows a graph of the cooling fluid flow rate and static pressure at an inlet of the invention in function of the rotations per minute of the shaft.

FIG. 8 shows a graph of the cooling fluid flow rate and static pressure at an inlet of the invention in function of the rotations per minute of the shaft. The graph shows that the flow rate of the cooling fluid increases and the static inlet pressure decreases as the rotational speed of the electric machine 1 increases. At point B, the static inlet pressure is 0 Pa, indicating that the pressure difference caused by suction function of the outlet section 12 is canceled out by the pressure losses over the cooling channel 4. An increase in the rotational speed beyond point B causes a negative static pressure at the inlet, indicating that beyond this point no external power supply such as a separate pump is necessary to maintain the cooling fluid flow. The graph also shows that the suction function starts influencing the flow rate at low rotational speeds.

Figure 9:
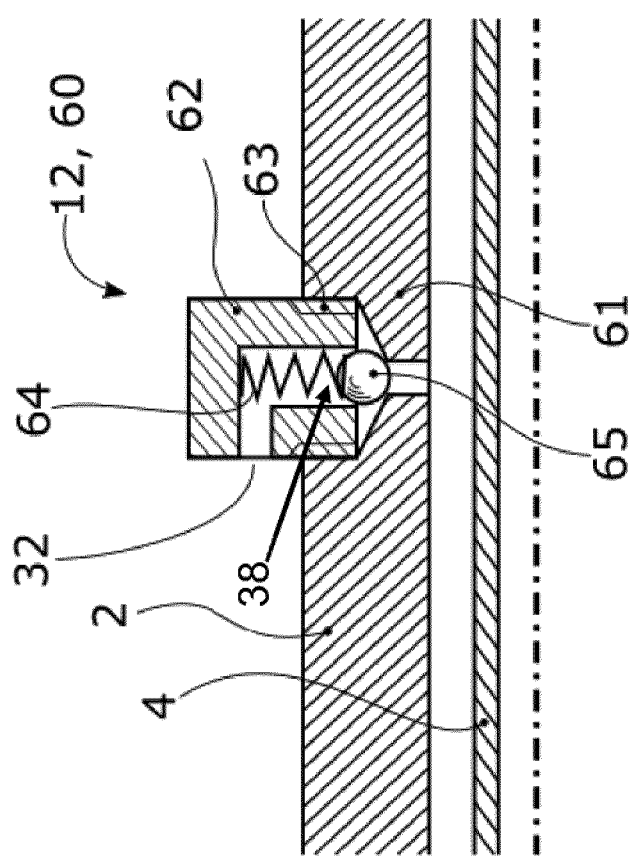
FIG. 9 shows an example schematic embodiment of an outlet section with a check valve according to the invention.

FIG. 9 shows an alternative outlet section 12 for use on a hollow shaft 2. In the drawing, a check valve 60 is partially integrated in the shaft, with the valve seat manufactured as integral part of the shaft, the valve body 62 fixed with a screw-in connection 63, and the spring 64 and the ball 65 clamped in between the valve body and the valve seat. The outlet channel 38 and its fluid connection to the cooling channel 4 are also integrated in the shaft. The suction pump body 62 can be machined by turning and has radial drilled outlet holes openings 32. For the stiffness of the spring 64, the centrifugal forces of the ball 65 need to be taken into account.

FIG. 10 shows cooling rib 80 geometries for the rotor shaft. The cooling rib 80 geometries shown comprise a tube 86, forming the inner channel 4a, and protrusions 81, forming the outer channel 4b, that make contact towards an inner wall of the rotor shaft on their outer diameter. A large contact area with the hollow shaft is desired to transfer the heat to the cooling fin. A large surface towards the flow is also desired to transfer the heat to the coolant. The protrusions or extensions 81 contain a flexible element 82, and their maximum diameter is slightly oversized with respect to the inner shaft surface, which generates a clamping force when inserted, and fixes the cooling rib in place. The flexible element 82 has a radial part 83 that conducts heat to the inner tube forming the inner channel 4a. The flexible element 82 further has a spring portion 84 biasing a part 85 of the flexible element 82 outwardly, such that the part 75 clamps on an inner shaft surface. The inner tube 86 serves as the inner channel 4a, bringing the fluid towards the opposite end of the shaft. If inserted in a drilled hole with conical end, fluid will be allowed to flow from the inner tube towards the outer portion of the cooling rib, making use of the conical cavity, that cannot be occupied by the cooling rib geometry 80. Hence the protrusions 81, together with the inner bore of the rotor shaft 2 forms the outer channel 4b, where fluid returns to the side, where the inlet and outlet are located.

FIG. 10a shows a perspective view of the cooling rib shown in FIG. 10d. It illustrates, that the cooling rib is a straight profile with a constant cross-section, that can be manufactured as an extrusion profile and cut to the appropriate length needed.

FIG. 10b shows a design of the cross section of the cooling rib, with maximized metal contact surface towards the rotor shaft. the top and bottom portion of the protrusions 81 are slightly undersized in diameter and present a loose fit inside the shaft, whereas towards the left and right the outer diameter is slightly oversized. The top and bottom portion of the protrusion hence serve as the spring portions 84, whereas the left and right portions of the protrusions serve as the part 85 clamping on the inner shaft surface. This makes a spring out of each outer quarter circle, clamping the tube to the left and right.

FIG. 10c shows a design of the cross section of the cooling rib 80, with maximized wetted perimeter of the cooling rib 80. Since the spring elements have fluid contact on both sides, the wetted perimeter is increased at the sacrifice of metal contact with the shaft.

FIG. 10d shows a design, that balances the two previously discussed design in terms of wetted perimeter and metal contact towards the shaft. Additionally, there are three radial parts 83 that can conduct heat towards the inner tube 86 instead of two.

FIG. 10e shows a design improvement over FIG. 10d, further increasing metal contact towards the shaft by increasing the number of parts 85 that clamp on the inner shaft surface, and by adding a fourth radial part 83 for metal conduction towards the inner tube. However, due to the smaller spring portion 84, tighter tolerances may be necessary, to obtain the desired clamping force.

FIG. 10f shows a design with maximized thermal conduction towards the inner tube 4a, utilizing nine radial parts 83

All designs of FIG. 10 feature a similar flow cross section, yielding pressure drops that are comparable. The choice of the cooling rib design depends on different factors. If the cooling fluid used has a high heat exchange with the walls, e.g. due to easy transition to turbulence and high heat conductivity, e.g. water, the contact surface with the shaft walls is most important, as it can be the bottleneck for getting the heat out of the shaft. This may lead to the design in FIG. 10b. If the cooling fluid has a high heat capacity, e.g. water again, the number of heat conductive feet towards the inner tube is important, as the fluid will be able to extract heat already on its way in the inner tube without changing its temperature too much to be useless on the return in the outer channel. This may lead to the design in FIG. 10f. If, the coolant has a low heat exchange with the channel walls, e.g. transmission oil, maximizing the wetted surface is most important, leading to the design of FIG. 10c. Designs 10d and 10e are compromises between the different design requirements.

FIG. 11 shows an electric motor rotor 1a with cooling channel 4, where the inner cooling channel 4a passes through the rotor shaft, but the outer cooling channel 4b passes outside the rotor shaft. This may be achieved by recesses 43 in the laminated iron package, forming channels together with the outer surface of the rotor shaft 2. Drilled holes 45 at the opposite end of the shaft let the fluid pass from the inner channel 4a, inside the shaft, towards the outer channel 4b, outside the shaft. The recesses in the rotor stack 43 may be sealed towards the axial directions by appropriate rotor end plates 41 and 42. A cooling in this fashion is very effective in keeping the shaft temperature low, as the recesses suppress heat conduction from the rotor stack towards the shaft, and the shaft is cooled from both the inside and the outside. The suction pump ring 12 may be mounted on an extension of the end plate 42, with the holes 40 passing the fluid to the suction pump outlet drilled therein.

FIGS. 12a, 12b and 12c shows different designs of the outlet section of the suction pump mechanism that are integrated in a park lock wheel of a transmission. FIG. 12a shows a solution with at least one straight outlet hole 38. Said hole may be drilled at an angle to form the outlet 32 at the side surface of the park lock wheel, as to not interfere with the park lock geometry 50. On the inner radius, a couple of teeth of the splined connection need to be omitted, location 51, to make space for a matching pair of holes for the fluid to pass from the shaft towards the park lock wheel. The at least one outlet hole may be drilled at a position of low mechanical stresses in case of park lock engagement. Such an integration minimizes the number of parts needed in the assembly.

FIG. 12b shows an outlet section integrated into a park lock wheel with a dedicated fluid connection surface 52 that does not interfere with spline teeth and with a siphon built in, as a portion of the outlet hole 38 is positioned at a larger radius than the outlet 32.

FIG. 12c shows a different solution for an outlet section integrated into a park lock wheel, where the outlet hole is realized by milling a recess 53 from the axial direction. The channel 38 is then only completed by an adjacent part 54 in the assembly, with a certain radius, e.g. a gear or a bearing, that seals the recess 53 in axial direction to form the channel 38. The recess 53 extends beyond the radius of the adjacent part, where it naturally forms the outlet 32 due to a lack of axial sealing of the recess. The recess may be formed in such way that the channel forms a siphon, keeping a portion of the fluid in a U-shaped bent to prevent air from entering the channel Although the invention is explained with examples referring to an electric machine, the invention can be provided in any type of motor having a rotor shaft through which a cooling channel runs and that has an outlet opening via which the cooling fluid is exited.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the scope of the appended claims. Further, many of the elements that are described are functional entities that may be implemented as discrete or distributed components or in conjunction with other components, in any suitable combination and location.

Many variants are possible and are comprised within the scope of the following claims.

The invention claimed is:
1. A motor comprising:
 a rotor shaft comprising a cooling channel having at least one inlet for receiving cooling fluid and at least one outlet at an outer radial side of the rotor shaft arranged to allow cooling fluid to flow out of the cooling channel, wherein the at least one outlet of the cooling channel is provided at a same end of the rotor shaft as the at least one inlet of the cooling channel, the motor further comprising:

at least one outlet section fluidly connected to the at least one outlet of the cooling channel and arranged to allow the cooling fluid to flow out of the cooling channel, wherein the at least one outlet section comprises at least one outlet opening for the cooling fluid to splash out, wherein the at least one outlet section comprises an outlet channel fluidly connecting the at least one outlet of the cooling channel with the at least one outlet opening of the outlet section, wherein a radial position of the at least one outlet opening of the outlet section, measured from a rotational axis of the rotor shaft, is larger than a radial position of the cooling channel inside of the rotor shaft such that when the motor is in operation cooling fluid is sucked towards the at least one outlet opening of the outlet section, wherein a majority of the outlet channel is arranged in a radial direction of the rotor shaft, and wherein the motor comprises a cooling fluid reservoir and wherein the at least one inlet of the cooling channel is fluidly connected to the cooling fluid reservoir.

2. The motor according to claim 1, wherein the cooling channel comprises an inner channel and an outer channel separated from the inner channel, wherein the inner channel is fluidly connected to the at least one inlet of the cooling channel and wherein the outer channel is fluidly connected to the at least one outlet of the cooling channel, wherein the inner channel and the outer channel are fluidly connected to form the cooling channel at an end of the rotor shaft opposite of the other end with the at least one inlet and outlet.

3. The motor according to claim 2, wherein the cooling channel comprises a cooling rib.

4. The motor according to claim 3, wherein the cooling rib comprises a tube forming the inner channel and an exterior of the tube forming the outer channel of the cooling channel.

5. The motor according to claim 4, wherein the cooling rib comprises protrusions extending outwardly from the tube for increasing a contact surface with the cooling fluid.

6. The motor according to claim 5, wherein the protrusions of the cooling rib are spring biased outwardly of the tube, towards an inner wall of the rotor shaft, such that at least part of the protrusions engage with the inner wall of the rotor shaft.

7. The motor according to claim 1, wherein the outlet channel of the at least one outlet section is provided as a radially extending bore.

8. The motor according to claim 7, wherein an internal diameter of the radially extending bore is decreasing in an outwardly direction.

9. The motor according to claim 1, wherein at least a part of the at least one outlet section is at a larger distance from the rotational axis of the rotor shaft than the at least one outlet opening.

10. The motor according to claim 9, wherein the at least one outlet section is U-shaped, such that a bridge between legs of the U-shaped section is at a larger distance from a center line of the rotor shaft than the at least one outlet opening.

11. The motor according to claim 1, wherein the motor is an electric machine having a rotor mounted to the rotor shaft and a stator provided around the rotor.

12. The motor according to claim 11, wherein the stator comprises outwardly extending end windings at at least one end of the stator, wherein the outlet channel comprises at least one outlet opening and wherein the at least one outlet opening is configured as to spray cooling fluid to the outwardly extending end windings for cooling of said end windings.

13. The motor according to claim 1, wherein the cooling fluid reservoir is at an elevated position with respect to the cooling channel.

14. The motor according to claim 1, wherein the cooling fluid reservoir is passively filled by fluid splash of a rotating component present in a same housing as the rotor shaft.

15. The motor according to claim 1, wherein the at least one outlet section comprises a flow restriction.

16. The motor according to claim 1, wherein the at least one outlet section comprises a nozzle.

17. The motor according to claim 1, wherein a ring is provided engageable with an outer surface of the rotor shaft, wherein the ring comprises the at least one outlet section.

18. The motor according to claim 1, wherein the outlet channel comprises at least one outlet opening and wherein a cooled surface is provided at or near the at least one outlet opening against which the cooling fluid exiting the at least one outlet opening is sprayed to cool down the cooling fluid for further use.

19. The motor according to claim 1, wherein the motor is comprised in a vehicle powertrain, and wherein the at least one outlet section of the cooling channel is integrated in a park lock wheel which is connectable to the rotor shaft.

20. The motor according to claim 1, wherein the outlet channel comprises at least one outlet opening and where the at least one outlet section comprises a check valve, said check valve being suitable to close off the at least one outlet opening when the cooling fluid pressure inside the at least one outlet section is below a threshold.

21. The motor according to claim 1, wherein the rotor shaft comprises two shaft parts engaged to each other with a spline connection, the at least one outlet being provided at a final spline end of the spline connection, and being realized by at least one missing tooth of the spline connection.

22. The motor according to claim 1, wherein a part of the cooling channel fluidly connecting the at least one inlet and the at least one outlet is formed between axially extending recesses on an inner surface of a lamination stack and an outer surface of the rotor shaft.

23. An electric or hybrid vehicle powertrain comprising:
a motor according to claim 1, wherein the motor is an electric machine;
wherein the cooling channel of the rotor shaft is arranged for fluid connection to a cooling system of the electric or hybrid vehicle transmission to allow a cooling fluid to flow into the cooling channel for cooling the electric machine.

24. The motor according to claim 1, wherein the at least one outlet section is provided as a ring-shaped part mounted on the rotor shaft.

25. A method for cooling of a motor, including:
providing a motor having a rotor with a rotor shaft and a stator mounted over the rotor; the rotor shaft having a cooling channel having at least one inlet for receiving cooling fluid and at least one outlet at an outer radial side of the rotor shaft arranged to allow cooling fluid to flow out of the cooling channel, wherein the at least one outlet of the cooling channel is provided at a same end of the rotor shaft as the at least one inlet of the cooling channel, the motor further comprising:

at least one outlet section fluidly connected to the at least one outlet of the cooling channel and arranged to allow the cooling fluid to flow out of the cooling channel, wherein the at least one outlet section comprises at least one outlet opening for the cooling fluid to splash out, wherein the at least one outlet section comprises an outlet channel fluidly connecting the at least one outlet of the cooling channel with the at least one outlet opening of the outlet section, wherein a radial position of the at least one outlet opening of the outlet section, measured from a rotational axis of the rotor shaft, is larger than a radial position of the cooling channel inside of the rotor shaft such that when the motor is in operation due to centrifugal forces acting on the cooling fluid the cooling fluid is sucked towards the at least one outlet opening of the outlet section, wherein a majority of the outlet channel is arranged in a radial direction of the rotor shaft, and wherein the method further includes: providing a cooling fluid reservoir and fluidly connecting the cooling fluid reservoir with the at least one inlet of the cooling channel.

* * * * *